United States Patent
Minemura et al.

(10) Patent No.: US 10,559,205 B2
(45) Date of Patent: Feb. 11, 2020

(54) OBJECT EXISTENCE DETERMINATION METHOD AND APPARATUS

(71) Applicants: DENSO CORPORATION, Kariya, Aichi pref. (JP); TOYOTA JIDOSHA KABUSHIKI KAISHA, Toyota-shi, Aichi-ken (JP)

(72) Inventors: Akitoshi Minemura, Kariya (JP); Yosuke Ito, Kariya (JP); Jun Tsuchida, Okazaki (JP); Hitoshi Yuasa, Gotemba (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 154 days.

(21) Appl. No.: 15/562,369

(22) PCT Filed: Mar. 31, 2016

(86) PCT No.: PCT/JP2016/060775
§ 371 (c)(1),
(2) Date: Sep. 27, 2017

(87) PCT Pub. No.: WO2016/159288
PCT Pub. Date: Oct. 6, 2016

(65) Prior Publication Data
US 2018/0114442 A1  Apr. 26, 2018

(30) Foreign Application Priority Data
Mar. 31, 2015  (JP) .................. 2015-072918

(51) Int. Cl.
G08G 1/16 (2006.01)
B60Q 9/00 (2006.01)
B60T 7/22 (2006.01)

(52) U.S. Cl.
CPC .............. *G08G 1/166* (2013.01); *B60Q 9/008* (2013.01); *B60T 7/22* (2013.01); *B60T 2201/022* (2013.01); *B60T 2210/32* (2013.01)

(58) Field of Classification Search
None
See application file for complete search history.

(56) References Cited

U.S. PATENT DOCUMENTS

| 2010/0030426 | A1* | 2/2010 | Okita ........................ B60T 7/22 701/41 |
| 2013/0013184 | A1 | 1/2013 | Morotomi et al. |
| 2016/0193999 | A1 | 7/2016 | Sasabuchi |

FOREIGN PATENT DOCUMENTS

| JP | 2004268829 A | 9/2004 |
| JP | 2006154967 A | 6/2006 |

(Continued)

OTHER PUBLICATIONS

Bishop, "Intelligent Vehicle Technology and Trends", 2005, Artech House Publishers, p. 28-34 (Year: 2005).*

*Primary Examiner* — Tamara L Weber
(74) *Attorney, Agent, or Firm* — Knobbe, Martens, Olson & Bear, LLP

(57) ABSTRACT

A setting unit of an object existence determination apparatus sets an object-existence determination region with a lateral width in the travelling direction of an own vehicle using a lateral speed of a target object and a determination result by a straight-travel determining unit. An existence determining unit determines, based on the lateral position of the target object and the object-existence determination region, whether there is a possibility of at least part of the target object existing on a travelling course of the own vehicle. The setting unit sets the lateral width of the object existence determination region to be larger as the lateral speed becomes higher, and sets, upon determination that the own (Continued)

vehicle is not travelling straight, the lateral width of the object existence determination region to be smaller than the lateral width of the object-existence determination region used when the own vehicle is travelling straight.

16 Claims, 6 Drawing Sheets

(56) References Cited

FOREIGN PATENT DOCUMENTS

| | | |
|---|---|---|
| JP | 2012141770 A | 7/2012 |
| JP | 5641271 B1 | 12/2014 |
| WO | 2015008380 A1 | 1/2015 |

\* cited by examiner

OBJECT EXISTENCE DETERMINATION METHOD AND APPARATUS

TECHNICAL FIELD

The present invention relates to methods and apparatuses for determining whether there is a possibility of an object, which is existing in a travelling direction of an own vehicle, being located on a travelling course of the own vehicle.

BACKGROUND ART

Conventionally, pre-crash safety (PCS) systems are known; these PCS systems mitigate and/or avoid collision damage between an own vehicle and objects, i.e. obstacles, such as other vehicles, pedestrians, or road structures located in the travelling direction of the own vehicle. Such a PCS system obtains a time to collision (TTC) with an object based on a relative distance of the obstacle with respect to the own vehicle and a relative speed or a relative acceleration of the obstacle relative to the own vehicle. The TTC represents a margin time until which the own vehicle would collide with the obstacle. Then, the PCS system causes a warning device to provide, to the driver of the own vehicle, a warning about the approach of the obstacle, and/or activates a braking device of the own vehicle.

The PCS system has a predetermined determination zone ahead of the travelling direction of the own vehicle in order to determine whether there is a high possibility of an obstacle colliding with the own vehicle. This aims to detect any pedestrian, who has a fast lateral moving speed, approaching the own vehicle, as early as possible.

Patent document 1 describes a collision risk determination apparatus as a known technology according to such a PCS system. The collision risk determination apparatus disclosed in patent document 1 includes a vehicle-width zone, i.e. a first determination zone, established based on a predicted travelling path of an own vehicle, and pedestrian enterable zones, i.e. second determination zones, established at both lateral sides of the vehicle width zone based on the maximum moving speed of a pedestrian. The first determination zone and the second determination zones constitute a risk determination zone.

Then, the collision risk determination apparatus determines that a collision risk is high when there is a pedestrian in the risk determination zone, thus activating the PCS system.

CITATION LIST

Patent Literature

Japanese Patent Application Publication No. 2004-268829

SUMMARY

Technical Problem

The collision risk determination apparatus disclosed in patent document 1 includes the second determination zones established based on the maximum moving speed of a pedestrian in addition to the first determination zone established based on the predicted travelling path of the own vehicle; the first and second determination zones constitute the risk determination zone. For this reason, the risk determination zone of the collision risk determination apparatus is wider as compared to when the first determination zone established based on the predicted travelling path of the own vehicle is used as a risk determination zone. This may cause the collision risk determination apparatus to determine that there is a high possibility of a collision between a pedestrian and the own vehicle when there is a pedestrian in the second determination zone although the moving speed of the pedestrian has been changed so that an actual collision risk has decreased. Then, the collision risk determination apparatus may activate the PCS system, resulting in unnecessary activation of the braking device and/or the warning device.

As described above, the collision risk determination apparatus obtains the moving speed of a pedestrian based on the relative speed between the pedestrian and the own vehicle. For this reason, the collision risk determination apparatus may determine, based on the travelling state of the own vehicle, that the pedestrian is moving laterally although the pedestrian is actually not approaching the travelling course of the own vehicle or is stopped. That is, during a steering operation of the own vehicle, a pedestrian seems to move laterally in a direction opposite to the steering direction of the own vehicle.

For this reason, the collision risk determination apparatus may establish the second determination zones for a pedestrian during a steering operation of the own vehicle even if the pedestrian is actually not moving laterally or is moving to be away from the own vehicle. In addition, the collision risk determination apparatus may determine that a collision risk between a pedestrian located in the second determination zone and the own vehicle is high even if an actual collision risk between the pedestrian and the own vehicle is low. This may result in unnecessary activations of the braking device and/or the warning device.

In view of the above problems, the present invention mainly seeks to provide object existence determination methods and apparatuses, each of which is capable of accurately determining whether an object existing in front of an own vehicle is located on a travelling course of the own vehicle.

Solution to Problem

An object existence determination apparatus according to a first aspect of the present invention includes an obtaining unit that obtains a lateral position and a lateral speed of a target object located in a travelling direction of an own vehicle. The lateral position represents a relative position of the target object relative to the own vehicle in a lateral direction perpendicular to the travelling direction of the own vehicle. The lateral speed represents a lateral relative speed of the target object relative to the own vehicle in the lateral direction. The object existence determination apparatus includes a straight travel determining unit that determines whether the own vehicle is travelling straight. The existence determination apparatus includes a setting unit that sets an object existence determination region in the travelling direction of the own vehicle in accordance with the lateral speed obtained by the obtaining unit and a determination result by the straight travel determining unit. The object existence determination region has a width in the lateral direction. The object existence determination apparatus includes an existence determining unit that determines, based on the lateral position of the target object and the object existence determination region, whether there is a possibility of at least part of the target object existing on a travelling course of the own vehicle. The setting unit is configured to set the width of the object existence determination region in the lateral direction to be larger as the lateral speed becomes higher. The setting unit is also configured to set, upon determination that the own vehicle is not travelling straight, the width of the object existence determination region in the lateral direction to be smaller than the lateral width of the object-existence determination region used when the own vehicle is travelling straight.

An object existence determination method according to a second aspect of the present invention includes an obtaining step that obtains a lateral position and a lateral speed of a target object located in a travelling direction of an own vehicle. The lateral position represents a relative position of the target object relative to the own vehicle in a lateral direction perpendicular to the travelling direction of the own vehicle. The lateral speed represents a lateral relative speed of the target object relative to the own vehicle in the lateral direction. The object existence determination method includes a straight travel determining step that determines whether the own vehicle is travelling straight.

The object existence determination method includes a setting step that sets an object existence determination region in the travelling direction of the own vehicle in accordance with the lateral speed obtained by the obtaining step and a determination result by the straight travel determining step, the object existence determination region having a width in the lateral direction. The object existence determination method includes an existence determining step that determines, based on the lateral position of the target object and the object existence determination region, whether there is a possibility of at least part of the target object existing on a travelling course of the own vehicle. The setting step is configured to set the width of the object existence determination region in the lateral direction to be larger as the lateral speed becomes higher. The setting step is also configured to set, upon determination that the own vehicle is not travelling straight, the width of the object existence determination region in the lateral direction to be smaller than the lateral width of the object existence determination region used when the own vehicle is travelling straight.

If the target object has a high value of the lateral speed, there is a high possibility of the target object being located, in the future, in the travelling course of the own vehicle with movement of the target object.

From this viewpoint, each of the object existence determination method and apparatus according to the first and second aspects sets the width of the object existence determination region in the lateral direction to be larger as the lateral speed becomes higher. This increases the likelihood of determination that there is a possibility of a target object, which has a high value of the lateral speed, being located in the travelling course of the own vehicle even if the lateral position of the target vehicle is located to be separated from the travelling course of the own vehicle. This makes it easier to determine that there is a possibility of a target object, which has a high value of the lateral speed and is located to be separated from the travelling course of the own vehicle, actually existing in the travelling course of the own vehicle.

On the other hand, if the own vehicle is not travelling straight, for example, is turning, the lateral speed of the target object may be caused from turning of the own vehicle. If the lateral width of the object existence determination region were increased based on this lateral speed, it would be determined that there is a possibility of such a target object, which is unlikely to be located in the travelling course of the own vehicle in the future, existing in the travelling course of the own vehicle.

From this viewpoint, each of the object existence determination method and apparatus according to the first and second aspects sets, upon determination that the own vehicle is turning, the lateral width of the object existence determination region to be smaller than the lateral width of the object existence determination region upon determination that the own vehicle is travelling straight. This prevents an increase of the lateral width of the object existence determination region due to the lateral speed that is caused by the behavior of the own vehicle upon the own vehicle being not travelling straight. This therefore reduces the capability of determination that there is a possibility of a target object, which is unlikely to be located in the travelling course of the own vehicle in the future, being existing in the travelling course of the own vehicle.

DESCRIPTION OF THE EMBODIMENTS

Figure 1:
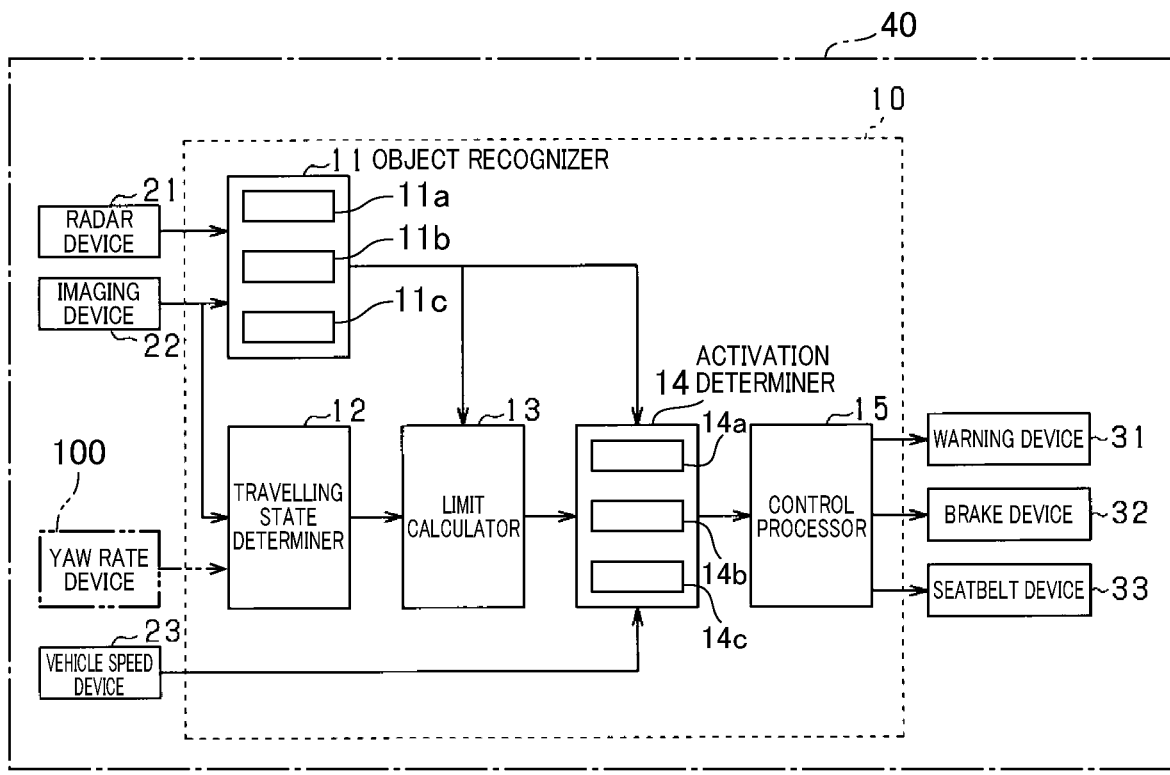
FIG. 1 is a structural diagram of a vehicle control apparatus according to the first embodiment of the present invention.

The following describes embodiments of the present disclosure with reference to the accompanying drawings. In the embodiments, like parts between the embodiments, to which like reference characters are assigned, are omitted or simplified to avoid redundant description.

First Embodiment

A vehicle control apparatus according to the first embodiment is installed in an own vehicle 40. The vehicle control apparatus serves as a PCS system that 1. Determine whether an object is located in the travelling direction of the own vehicle 40, i.e. in the forward direction of the own vehicle 40

2. Perform control to avoid collision between the object and the own vehicle 40 and/or mitigate damage due to collision therebetween upon determination that the object is located in the travelling direction of the own vehicle 10

Referring to FIG. 1, a cruise-assist ECU 10, which serves as a cruise-assist apparatus, includes a computer that is comprised of a CPU, a memory including a ROM and a RAM, and an I/O unit. The CPU of the cruise-assist ECU runs programs installed in the ROM to implement various functions described later.

A radar device 21, an imaging device 22, and a vehicle speed sensor 23 are connected to the cruise-assist ECU 10 as sensor devices for inputting various pieces of detected information to the cruise-assist ECU 10.

For example, the radar device 21 is an available millimeter radar transmitting a high-frequency signal within a millimeter wave range as its transmission waves, and is mounted at, for example, the center of the front end of the own vehicle 40. The radar device 21 has a center axis extending, from the center of the front end of the own vehicle 40, in the travelling direction of the own vehicle 40. The radar device 21 has a predetermined detection range that has a predetermined view angle, such as a detection angle, or scanning angle, and extends in the right and left direction around the center axis. That is, the radar device 21 is capable of detecting the position of an object within the detection range.

Specifically, the radar device 21 transmits probe waves to the detection range through a transmitting antenna, and receives reflected waves, i.e. echoes, based on reflection of the transmitted probe wave by an object through respective receiving antennas. The radar device 21 calculates the distance of the object from the own vehicle 40 based on the transmission time of the prove waves and the reception times of the respective reflected waves.

The radar device 21 also calculates the relative speed of the object relative to the own vehicle 40 based on the frequencies of the reflected waves based on reflection of the transmitted radar wave by the object; the frequencies have been changed based on Doppler effect.

In addition the radar device 21 calculates the azimuth of the object based on the differences in phase between the reflected waves received by the respective receiving antennas.

Note that the radar device 21 is capable of identifying the relative position of the object relative to the own vehicle 40 based on the calculated position and azimuth of the object. Note that the radar device 21 performs, for a predetermined cycle, referred to as a first cycle, a task of 1. Transmitting the radar wave 2. Receiving the reflected waves based on reflection of the transmitted radar wave 3. Calculating the reflection position, i.e. the relative position of an object and the own vehicle 40, and the relative speed of the object relative to the own vehicle 40 in accordance with the received reflected waves Then, the radar device 21 sends the reflection position and the relative speed of the object to the cruise-assist. ECU 10 as first detection information. Note that objects detected by the radar device 21 will be referred to as radar-based objects.

Figure 2:
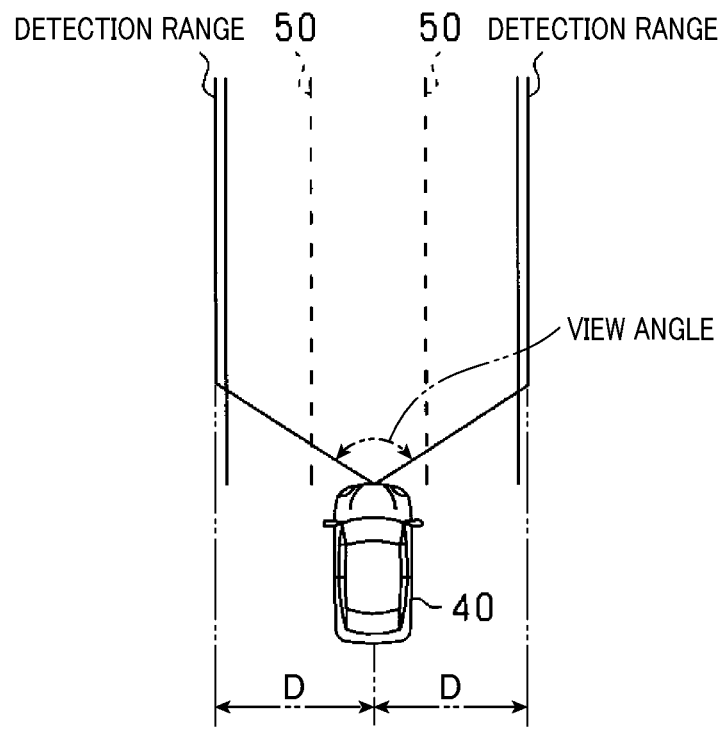
FIG. 2 is a view illustrating how to determine a travelling state of an own vehicle according to the first embodiment.

FIG. 2 illustrates an example of the detection range of the radar device 21. As illustrated in FIG. 2, the detection range is configured to 1. Horizontally expand from the radar-wave transmitting point of the radar device 21 at the predetermined view angle up to a predetermined distance D 2. Thereafter, extend in the travelling direction of the own vehicle 40 up to a predetermined length Note that the irradiating range of the radar waves, i.e. radar beams, of the radar device 21 is usually set to have a fan beam pattern that expands from the radar-wave transmitting point around the center axis. That is, the irradiating range of the radar waves expand more in the horizontal direction than the detection range. From this viewpoint, the first embodiment is configured such that, for example, information detected outside the detection range is not used by the cruise-assist ECU 10 described later. For this reason, the detection range of the radar device 21 has the shape illustrated in FIG. 2.

The imaging device 22 is designed as a monocular imaging device, such as a CCD camera device, a CMOS image sensor device, or a near-infrared camera device. For example, the imaging device 22 is mounted to the center of the own vehicle 40 in the vehicle width direction at a predetermined height, and has an optical axis extending in front of the own vehicle 40. The imaging device 22 has a region, i.e. an imaging range, which horizontally extends around the optical axis within a predetermined angular range, i.e. a predetermined angle of view. The imaging device 22 captures, from the predetermined height, from a higher point of view, images of the region, i.e. the imaging range.

The imaging device 22 extracts, from a captured image, i.e. a frame image, feature points each indicative of the existence of an object. Specifically, the imaging device 22 extracts edge points from the captured image based on light-intensity information included in the captured image. Then, the imaging device 22 performs Hough transform of the extracted edge points. The Hough transform is capable of extracting, as feature points, points on a straight line on which some of the edge points are aligned, and/or points at which straight lines intersect. Note that the imaging device 22 performs, for a second cycle different from the first cycle of the radar device 21, a task of 1. Capturing a frame image 2. Extracting feature points for an object The imaging device 22 sends, to the cruise-assist ECU 10, the results of extracting the feature points as second detection information for the object as second detection information. Objects detected by the imaging device 22 will be referred to as image-based objects.

The vehicle speed sensor 23 is mounted to the rotary shaft that transfers torque to the driving wheels of the own vehicle 40, and is operative to obtain the speed of the own vehicle 40 based on the number of turns of the rotary axis.

The own vehicle 40 includes a warning device 31, a brake device 32, and a seatbelt device 33 as its safety devices that are driven in response to control instructions sent from the cruise-assist ECU 10.

The warning device 31 includes a speaker and/or a display mounted in the compartment of the own vehicle 40. The warning device 31 is configured to output warnings including, for example, warning sound and/or warning messages to inform the driver of a risk of collision in response to a control instruction sent from the cruise-assist ECU 10 when the cruise-assist ECU 10 determines that there is a high risk of collision of the own vehicle 40 with an object.

The brake device 32 is configured to brake the own vehicle 40. The brake device 32 is activated in response to a control instruction sent from the cruise-assist ECU 10 when the cruise-assist ECU 10 determines that there is a high risk of collision of the own vehicle 40 with an object. Specifically, the brake device 32 performs a brake-assist function of increasing braking force, which is based on the driver's brake operation, to the own vehicle 40, or an automatic brake function of automatically braking the own vehicle 40 if there is no braking operation by the driver.

The seatbelt device 33 serves as pretensioners each for tightening the corresponding seat belt mounted to the corresponding seat of the own vehicle 40. The seatbelt device 33 performs a preliminary operation to preliminarily tighten one or more seatbelts in response to a control instruction sent from the cruise-assist ECU 10 when the cruise-assist ECU 10 determines that there is a high risk of collision of the own vehicle 40 with an object. The seatbelt device 33 also tightens one or more seatbelts tight when the cruise-assist ECU 10 determines that a collision cannot be avoided to thereby hold the corresponding occupant, such as the driver, in the corresponding seat securely, thus protecting the corresponding occupant.

The cruise-assist ECU 10 functionally includes an object recognizer 11, a travelling state determiner 12, a limit calculator 13, an activation determiner 14, and a control processor 15.

The object recognizer 11 includes a first obtainer 11a serving as a first obtaining means, a second obtainer 11b serving as a second obtaining means, and a type identifier 11c serving as a type identifying means.

The first obtainer 11a cyclically obtains the first detection information from the radar device 21. The second obtainer 11b cyclically obtains the second detection information from the imaging device 22.

The object recognizer 11 obtains first position information for each radar-based object based on the position of the corresponding radar-based object, i.e. the reflection position of the corresponding radar-based object, and second position information for each image-based object based on the feature points corresponding to the image-based object. Then, the object recognizer 11 determines that a radar-based object and an image-based object are the same object when the corresponding first position information is close to the corresponding second position information. Next, the object recognizer 11 matches the corresponding first position information with the corresponding second position information.

Specifically, if the second position information about an image-based object is located to be close to the first position information about a radar-based object, there is a high possibility of a corresponding actual object being located at the position based on the first position information. The state where the first position information about each radar-based object is identical to or close to the second position information about the corresponding image-based object will be referred to as a fusion state. In other words, the fusion state shows that the radar device 21 and the imaging device 22 have each obtained the position of an object with high accuracy.

The object recognizer 11 cyclically performs an object recognizing task that includes 1. Obtaining the first detection information for each radar-based object
2. Obtaining the second detection information for each image-based object
3. Obtaining the fusion information about each object detected in the fusion state The object recognizer 11 stores, for each cycle, the position information about each radar-based object, the position information about each image-based object, and the position information about each object, i.e. each fusion-based object, detected in the fusion state into the memory as a detection history. The fusion information can include identification information.

The position information in each of the first detection information, the second detection information, and the fusion information obtained from an object includes at least 1. A position, i.e. a longitudinal position, of the detected shape of the object in the travelling direction, i.e. the longitudinal direction, of the own vehicle 40
2. A position, i.e. a lateral position, of the detected shape of the object in the direction perpendicular to the travelling direction, i.e. the lateral direction, of the own vehicle 40

For a fusion-based object, the object recognizer 11 refers to the detection history in accordance with identification information about the fusion-based information for each cycle to correspondingly determine whether the fusion-based object has been continuously in the fusion state. The object recognizer 11 determines that the fusion-based object is located at the corresponding position, i.e. the first position based on the detection result by the radar device 21 upon determination that the fusion-based object has been continuously in the fusion state. In addition, when it is determined that the fusion-based object is not detected in a cycle, the object recognizer 11 refers to the detection history for the fusion-based object, and assumes that there was the fusion-based object at the previous position, i.e. the position detected in the previous cycle during a predetermined time period.

Additionally, the object recognizer 11 performs pattern matching of the second detection information of a fusion-based object with feature patterns of many objects including vehicles, pedestrians, and roadside objects. Then, the object recognizer 11 determines, based on the result of the pattern matching, whether the fusion-based object is a vehicle or a pedestrian. Then, the object recognizer 11 causes the identified type, i.e. a vehicle or a pedestrian, of the fusion-based object to correlate with the corresponding fusion object. Note that the type of pedestrians can include persons who ride bicycles.

Next, the object recognizer 11 causes, for each fusion-based object, the corresponding relative position and relative speed Vped to correlate with one another. Then, the object recognizer 11 calculates, based on the corresponding relative position and relative speed Vped for each fusion-based object, a lateral speed Vped_x and a longitudinal speed Vped_y. The lateral speed Vped_x represents a relative speed in the lateral direction perpendicular to the travelling direction of the own vehicle 40, and the longitudinal speed Vped_y represents a relative speed in the longitudinal direction, i.e. the travelling direction, of the own vehicle 40.

In addition, the object recognizer 11 classifies the type of each fusion-based object in accordance with the result of the determination of whether the corresponding fusion-based object is a vehicle or a pedestrian, the lateral speed Vped_x, and the longitudinal speed Vped_y.

If the fusion-based object is a vehicle, the object recognizer 11 classifies, based on the longitudinal speed Vped_y, the vehicle into any one of 1. A preceding vehicle travelling in the same direction as the travelling direction of the own vehicle 40 ahead of the own vehicle 40

2. An oncoming vehicle travelling on an oncoming lane ahead of the own vehicle 40

3. A stopped vehicle stopped ahead of the own vehicle 40 in the travelling direction If the fusion-based object is a pedestrian, the object recognizer 11 classifies, based on the lateral speed Vped_x and the longitudinal speed Vped_y, the pedestrian into any one of 1. A preceding pedestrian walking in the same direction as the travelling direction of the own vehicle 40 ahead of the own vehicle 40

2. An oncoming pedestrian walking in the opposite direction of the travelling direction of the own vehicle ahead of the own vehicle 40

3. A stopped pedestrian stopped ahead of the own vehicle 40 in the travelling direction 4. A crossing pedestrian crossing ahead of the own vehicle 40 in the travelling direction In addition, for a radar-based object detected based on only the first detection information, the object recognizer 11 classifies, based on the longitudinal speed Vped_y, the radar-based object into any one of 1. A preceding object moving in the same direction as the travelling direction of the own vehicle 40 ahead of the own vehicle 40

2. An oncoming object moving in the direction opposite to the travelling direction of the own vehicle 40 ahead of the own vehicle 40 in the travelling direction 3. A stopped object stopped ahead of the own vehicle 40 in the travelling direction The travelling state determiner 12, which serves as a straight travel determining means, determines whether the own vehicle 40 is in a state of travelling straight forward in accordance with the second detection information sent from the imaging device 22.

The following schematically describes the method of determining whether the own vehicle 40 is travelling straight forward carried out by the travelling state determiner 12 with reference to FIG. 2.

The travelling state determiner 12 extracts, from the second detection information, lane marking lines, such as white lines, 50 painted on the road in the travelling direction of the own vehicle 40. The travelling state determiner 12 calculates the curvature of the lane marking lines 50 to correspondingly determine whether the lane marking lines 50 are straight lines or curved lines.

Upon determination that the lane marking lines 50 are straight lines, the travelling state determiner 12 estimates that the own vehicle 40 is travelling a straight section of the road, thus determining that the own vehicle 40 is in the state of linear motion.

Otherwise, upon determination that the lane marking lines 50 are curved lines, the travelling state determiner 12 estimates that the own vehicle 40 is travelling a curved section of the road, thus determining that the own vehicle 40 is not in the state of travelling straight forward.

In addition, the travelling state determiner 12 estimates a predicted course of the own vehicle 40 in accordance with the curvature of the lane marking lines 50.

The limit calculator 13 serves as, for example, a setting means. Specifically, the limit calculator 13 obtains, from the object recognizer 11, the lateral speed Vped_x of each of the objects including the fusion-based objects and the radar-based objects recognized by the object recognizer 11. The limit calculator 13 also obtains, from the travelling state determiner 12, the determination result of whether the own vehicle 40 is in the state of travelling straight forward.

Then, the limit calculator 13 serves as the setting means to set, based on the lateral speed Vped_x of each of the recognized objects and the determination result, a determination region for each of the recognized objects ahead of the own vehicle 40 in the travelling direction. The determination region set for each recognized object is a region located ahead of the own vehicle 40 in the travelling direction, and is used to determine whether there is a possibility of the corresponding object existing on the predicted course of the own vehicle 40.

Specifically, the limit calculator 13 sets the width of the determination region set for each recognized object in the lateral direction perpendicular to the travelling direction of the own vehicle 40 such that 1. A rightward width relative to a center line of the own vehicle 40, which represents the center of the lateral direction and also represents the travelling direction of the own vehicle 40, is a rightward limit XR 2. A leftward width relative to the center line of the determination region is a leftward limit XL Note that, when a recognized object is located rightward relative to the center line along the travelling direction of the own vehicle 40, the leftward limit XL cannot be obtained. Similarly, when a recognized object is located leftward relative to the center line along the travelling direction of the own vehicle 40, the rightward limit XR cannot be obtained. Note that the following describes a case where a recognized object is located rightward relative to the center line along the travelling direction of the own vehicle 40. In addition, when there are recognized objects, the task to calculate the rightward limit XR and the leftward limit XL by the limit calculator 13 is carried out for each of the recognized objects, so that the determination region is set for each of the recognized objects.

The limit calculator 13 obtains the rightward limit XR and the leftward limit XL for a recognized object, which will be referred to as a target object, in accordance with 1. The determination result of whether the own vehicle 40 is in the state of travelling straight forward 2. The lateral speed Vped_x of the target object obtained by the object recognizer 11

Note that, because the method of calculating the rightward limit XR is similar to the method of calculating the leftward limit XL, the method of calculating the leftward limit XL is omitted in the following descriptions.

Figure 3:
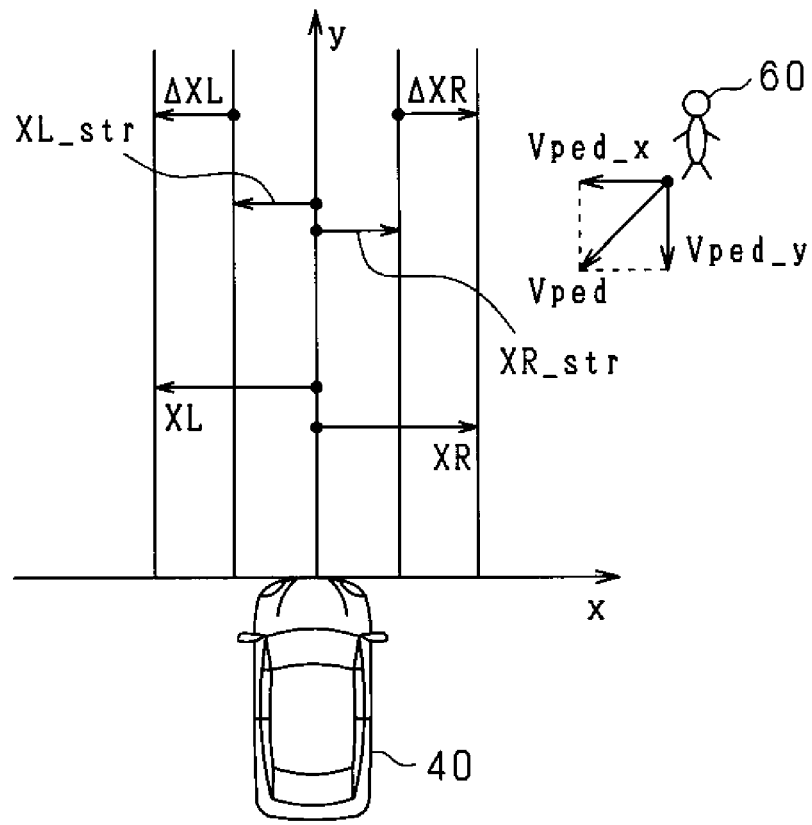
FIG. 3 is a view illustrating a determination region upon the own vehicle travelling straight.

First, the following describes the method of calculating the rightward limit XR of a target object, which is illustrated by reference numeral 60 in FIG. 3, when it is determined by the travelling state determiner 12 that the own vehicle 40 being in the state of travelling straight forward with reference to FIG. 3. Note that, in FIG. 3, the right direction from the forward center line of the own vehicle 40 is defined as an x-axis positive direction, and the direction of the forward center line of the own vehicle 40 is defined as a y-axis positive direction.

The limit calculator 13 adds a rightward correction value $\Delta XR$ to a rightward straight reference $XR\_str$ to calculate the rightward limit XR of the target object 60 in accordance with the following equation [1]:

$$XR = XR\_str + \Delta XR \qquad [1]$$

In the equation [1], the rightward straight reference XR_str is a constant used upon the own vehicle 40 being travelling straight, and is, for example, previously obtained based on the width of the own vehicle 40. On the other hand, multiplying a coefficient α to the absolute value of the lateral speed Vped_x of the target object 60 (see the following equation [2]) enables the rightward correction value ΔXR to be obtained:

$$\Delta XR = |Vped\_x| \times \alpha \quad [2]$$

This coefficient α represents a value corresponding to the type of the target object 60. Specifically, values of the coefficient α are set to respective types of objects recognizable by the object recognizer 11.

For example, if the target object 60 is a vehicle, the target object 60 unlikely has rapid movement in the lateral direction. In contrast, if the target object 60 is a pedestrian, there is a possibility of the target object 60 rapidly moving in the lateral direction, so that, for avoiding a collision with the target object 60, it is necessary to immediately address the lateral movement of the target object 60.

From this viewpoint, the limit calculator 13 sets a value of the coefficient α for the case of the target object 60 being a pedestrian to be larger than a value of the coefficient α for the case of the target object 60 being a vehicle. If the target object 60 is a vehicle, the limit calculator 13 can set a value of the coefficient α to be zero.

In addition, if the target object 60 is detected based on only the first detection information, there is a low credibility of the existence of the target object 60, so that, if the cruise-assist ECU 10 performs control to avoid a collision with the target object 60, there is a possibility of the safety devices being unnecessarily activated. From this viewpoint, the limit calculator 13 sets a value of the coefficient α for the target object 60 detected based on only the first detection information to be relatively small or to be zero.

When the lateral speed Vped_x of the target object 60 represents a speed of the target object 60 approaching the front side of the own vehicle 40, the sign of the lateral speed Vped_x is negative.

For this reason, when the target object 60 is located on the right hand of the center line of the own vehicle 40, and the sign of the lateral speed Vped_x is positive, this means that the target object 60 moves in the lateral direction to be away from the own vehicle 40. In this case, the limit calculator 13 sets the rightward correction value ΔXR to be zero so that the target object 60 is likely located outside the corresponding determination region. Similarly, when the target object 60 is located on the left hand of the center line of the own vehicle 40, and the lateral speed Vped_x of the target object 60 represents a speed of the target object 60 approaching the front side of the own vehicle 40, the sign of the lateral speed Vped_x is positive. Therefore, when the target object 60 is located on the left hand of the center line of the own vehicle 40, and the sign of the lateral speed Vped_x is negative, the limit calculator 13 sets a leftward correction value ΔXL to be zero.

An upper limit Xmax is established for the rightward limit XR. That is, if the rightward limit XR were increased endlessly in accordance with the lateral speed Vped_x of the target object 60, the cruise-assist ECU 10 would determine that even the target object 60, which has a low possibility of moving in the travelling course of the own vehicle 40, is existing in the corresponding determination region. This would result in there being a possibility of the safety devices being unnecessarily activated. This upper limit Xmax therefore aims to eliminate this possibility.

Figure 4:
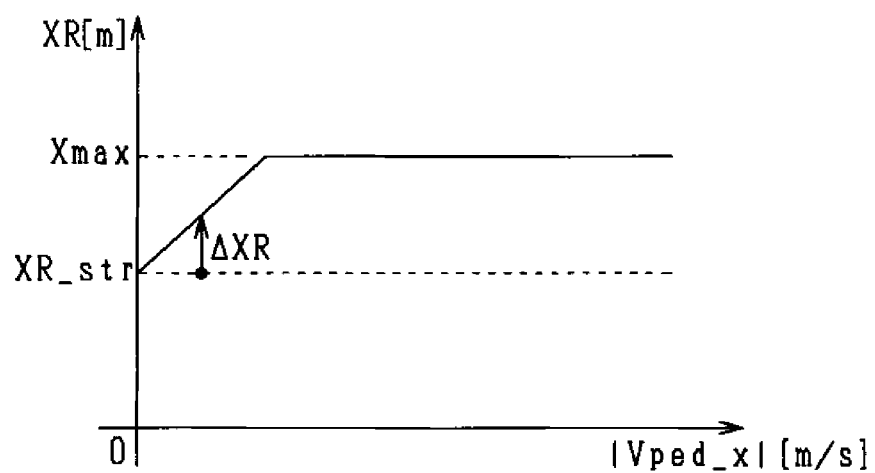
FIG. 4 is a graph illustrating a relationship between a lateral speed and a limit upon the own vehicle travelling straight.

FIG. 4 illustrates the relationship between the lateral speed Vped_x and the rightward limit XR, i.e. the sum of the rightward straight reference XR_str and the rightward correction value ΔXR. In FIG. 4, the horizontal axis represents the absolute value of the lateral speed Vped_x, and the vertical axis represents the rightward limit XR.

If the lateral speed Vped_x is zero, a value of the rightward limit XR is equal to a value of the rightward straight reference XR_str, because the rightward correction value ΔXR is zero. The rightward correction value ΔXR increases in proportion to the absolute value of the lateral speed. Vped_x, so that the rightward limit XR linearly increases. If the sum of the rightward straight reference XR_str and the rightward correction value ΔXR is equal to or more than the upper limit Xmax, the rightward limit XR is set to the upper limit Xmax.

Figure 5:
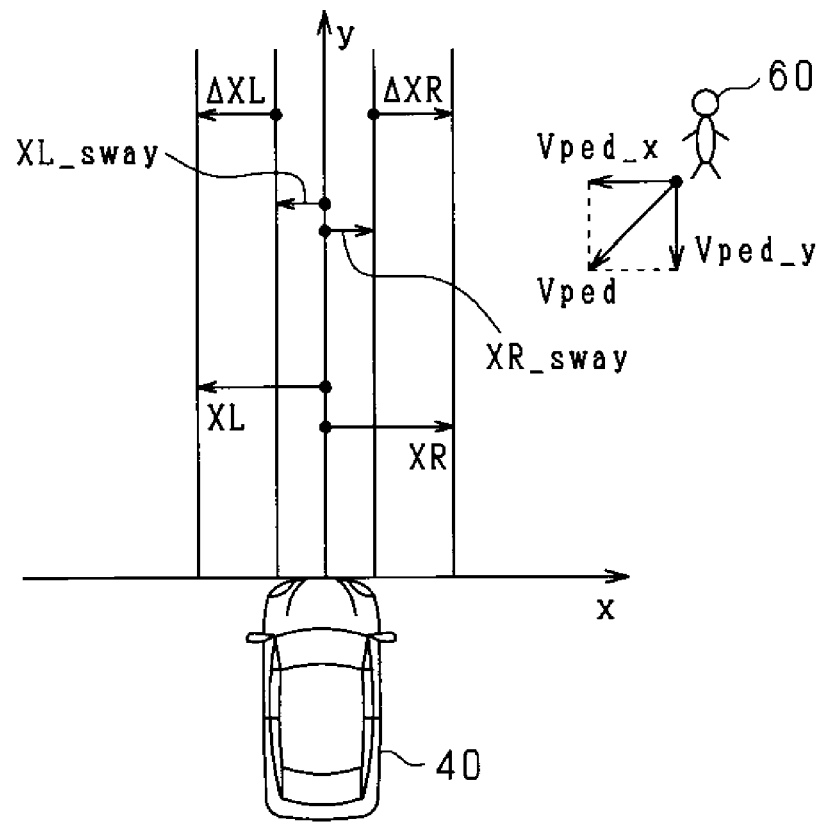
FIG. 5 is a view illustrating a determination region upon the own vehicle turning.

Next, the following describes the method of calculating the rightward limit XR of the target object 60 when it is determined by the travelling state determiner 12 that the own vehicle 40 being not in the state of travelling straight forward with reference to FIG. 5. Note that the determination region for the target object 60 is corrected to have a linear shape even if the travelling course of the own vehicle 40 is curved. This correction is carried out based on the predicted travelling course estimated by the travelling state determiner 12. Specifically, the position of the target object 60 in the lateral direction represents the deviation of the target object 60 from the travelling course, i.e. the center line, of the own vehicle 40 in the direction perpendicular to the travelling course of the own vehicle 40.

The limit calculator 13 adds the rightward correction value ΔXR to a rightward turning reference XR_sway to calculate the rightward limit XR of the target object 60 in accordance with the following equation [3]:

$$XR = XR\_sway + \Delta XR \quad [3]$$

In equation [3], the rightward turning reference XR_sway is a constant used upon the own vehicle 40 being turning, and is set to be smaller than the rightward straight reference XR_str. Because the rightward correction value ΔXR can be obtained in the same manner as the case where the own vehicle 40 is travelling straight, descriptions of the rightward correction value ΔXR are omitted. The upper limit Xmax is established for the rightward limit XR, which is similar to the case where the own vehicle 40 is travelling straight.

Figure 6:
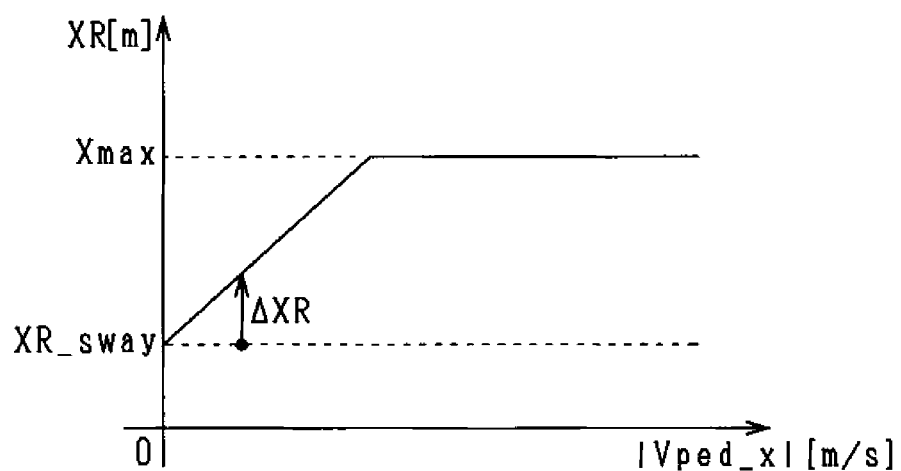
FIG. 6 is a graph illustrating a relationship between the lateral speed and the limit upon the own vehicle turning.

FIG. 6 illustrates the relationship between the lateral speed Vped_x and the rightward limit XR, i.e. the sum of the rightward turning reference XR_sway and the rightward correction value ΔXR. In FIG. 6, the horizontal axis represents the absolute value of the lateral speed Vped_x, and the vertical axis represents the rightward limit XR.

If the lateral speed Vped_x is zero, a value of the rightward limit XR is equal to a value of the rightward turning reference XR_sway, because the rightward correction value ΔXR is zero. The rightward correction value ΔXR increases in proportion to the absolute value of the lateral speed Vped_x, so that the rightward limit XR linearly increases. If the sum of the rightward turning reference XR_sway and the rightward correction value ΔXR is equal to or more than the upper limit Xmax, the rightward limit XR is set to the upper limit Xmax. At that time, because the rightward turning reference XR_sway is set to be smaller than the rightward straight reference XR_str, an absolute value of the lateral speed Vped_x upon the rightward limit XR becoming the upper limit. Xmax for the case of the own vehicle 40 being turning is greater than an absolute value of the lateral speed Vped_x upon the rightward limit XR becoming the upper limit Xmax for the case of the own vehicle 40 being travelling straight.

That is, if the own vehicle 40 is turning rightward while the target object 60 is not moving or moving rightward, the lateral speed. Vped_x of the target object 60 may be a negative value representing leftward movement, because the lateral speed Vped_x of the target object 60 is a relative speed relative to the own vehicle 40. Rightward turning of the own vehicle 40 while the target object 60 is moving leftward may cause the lateral speed Vped_x of the target object 60 to be greater. From this viewpoint, setting the rightward turning reference XR_sway to be smaller than the rightward straight reference XR_str enables the influence of turning of the own vehicle 40 on the rightward correction value ΔXR to be reduced; the rightward correction value ΔXR increases in proportion to the lateral speed Vped_x of the target object 60.

Note that it is possible to store, in the memory of the cruise-assist ECU 10, information indicative of the relationship among 1. The rightward limit XR
2. Each of the travelling states, i.e. the state of travelling straight and the state of not travelling straight, of the own vehicle 40
3. The lateral speed Vped_x of a target object 60

The information can be stored in a predetermined format, such as a table format or a map format.

In this case, the limit calculator 13 can read out, from the relationship information stored in the memory, a value of the rightward limit XR corresponding to the travelling stare of the own vehicle 40 and the lateral speed Vped_x. The limit calculator 13 can calculate a value of the rightward limit XR using a relational equation indicative of the relationship among 1. The rightward limit XR
2. Each of the travelling states, i.e. the state of travelling straight and the state of not travelling straight, of the own vehicle 40
3. The lateral speed Vped_x of a target object 60

The limit calculator 13 can also calculate the leftward limit XL in the same manner as the rightward limit XR.

Figure 7:
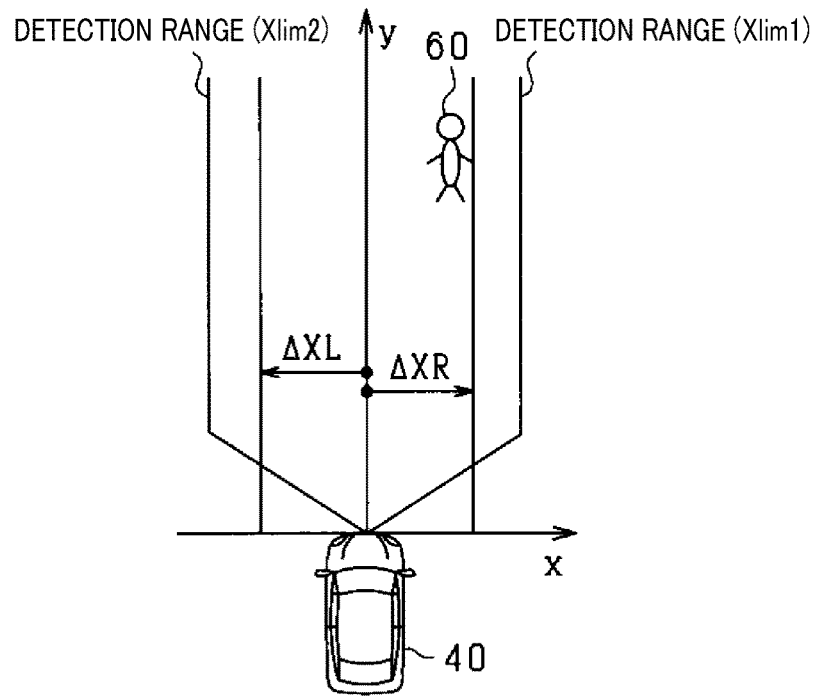
FIG. 7 is a view illustrating a method of determining whether there is a possibility of the own vehicle colliding with an object.

Next, the following describes the method of determining whether at least part of a target object 60 is in the travelling course of the own vehicle 40, which is carried out by the activation determiner 14, with reference to FIG. 14. If there are target objects 60, this routine is carried out for each of the target objects 60. The detection range of the radar device 12 is illustrated in FIG. 7.

The activation determiner 14 includes an existence determiner 14a serving as an existence determining means. The existence determiner 14a determines whether at least part of the target object 60 is located in, i.e. is existing in, the corresponding determination region in accordance with 1. The rightward limit XR and leftward limit XL obtained from the limit calculator 13
2. The lateral position of the target object 60 obtained from the object recognizer 11

In addition, the activation determiner 14 includes a collision time calculator 14b serving as a collision time calculating means.

The collision time calculator 14b calculates a time to collision (TTC), which represents a margin time until which the own vehicle 40 would collide with the target object 60, in accordance with the longitudinal speed Vped_y and longitudinal distance of the target object 60 obtained from the object recognizer 11 upon determination that at least part of the target object 60 is existing in the corresponding determination region. The collision time calculator 14b can use the relative acceleration in place of the longitudinal speed Vped_y.

The activation determiner 14 compares the calculated TTC with each of thresholds corresponding to the respective activation timings of the safety devices. Specifically, the thresholds corresponding to the respective activation timings of the warning device 31, the brake device 32, and the seatbelt device 33 are previously determined.

For example, the threshold corresponding to the activation timing of the warning device 31 is set to be larger than the thresholds corresponding to the respective activation timings of the brake device 32 and seatbelt device 33. This is because, if the driver notices, based on the warning output from the warning device 31, a possibility of the own vehicle 40 colliding with the target object 60, and depresses the brake pedal, the brake pedal 40 is activated to brake the own vehicle 40, making it possible to avoid this collision without the cruise-assist ECU 10 outputting the control instruction to the brake device 32.

As the threshold for the activation timing of the brake device, thresholds are individually determined for the respective activation timing of the brake-assist function and activation timing of the automatic brake function. The threshold for the activation timing of the brake-assist function and the threshold for the activation timing of the automatic brake function can be set to be equal to each other or different from each other.

In the first embodiment, the threshold for the brake-assist function and the threshold for the seatbelt device 33 during the brake-assist function being activated are for example set to be equal to each other. In the first embodiment, the threshold for the automatic brake function and the threshold for the seatbelt device 33 during the automatic brake function being activated are for example set to be equal to each other.

As described above, the thresholds for the respective activation timings of the warning device 31, the brake device 32, and the seatbelt device 33 as the safety devices are previously determined. For this reason, if the own vehicle 40 approaches the target object 60, so that the TTC becomes lower than the threshold for the activation timing of the warning device 31, the activation determiner 14 determines that it is time to activate the warning device 31, thus transmitting an activation determination signal of the warning device 31 to the control processor 15. The control processor 15 transmits the control instruction to the warning device 31 in response to receiving the activation determination signal. This causes the warning device 31 to be activated to output warnings, thus informing the driver of a risk of collision.

After activation of the warning device 31, if the own vehicle 40 further approaches the target object 60 with the brake pedal being not depressed by the driver, so that the TTC further decreases to become lower than the threshold for the activation timing of the automatic brake function of the brake device 32, the activation determiner 14 determines that it is time to activate the automatic brake function of the brake device 32, thus transmitting an activation determination signal of the automatic brake function of the brake device 32 to the control processor 15. The control processor 15 transmits the control instruction to each of the brake device 32 and seatbelt device 33 in response to receiving the activation determination signal. This causes the brake device 32 to be activated to perform braking control of the own vehicle 40, and the seatbelt device 33 to be activated to preliminarily tighten one or more seatbelts.

On the other hand, after activation of the warning device 31, if the own vehicle 40 further approaches the target object 60 despite the driver's depression of the brake pedal, so that the TTC further decreases to become lower than the threshold for the activation timing of the brake-assist function of the brake device 32, the activation determiner 14 determines that it is time to activate the brake-assist function of the brake device 32, thus transmitting an activation determination signal of the brake-assist function of the brake device 32 to the control processor 15. The control processor 15 transmits the control instruction to each of the brake device 32 and seatbelt device 33 in response to receiving the activation determination signal. This causes the brake device 32 to be activated to increase braking force based on the driver's depression of the braking pedal, and the seatbelt device 33 to be activated to preliminarily tighten one or more seatbelts.

That is, the activation determiner 14 and the control processor 15 serve as activation means to cooperatively activate the safety devices.

As described above, the drive-assist ECU 10 serving as a vehicle control apparatus achieves the following advantageous effects.

The cruise-assist ECU 10 is configured to increase the rightward correction value ΔXR and leftward correction value ΔXL as the absolute value of the lateral speed Vped_x of a target object 60 to correspondingly increase the rightward limit XR and the leftward limit XL of the determination region of the target object 60.

This configuration enables the determination region established based on the rightward limit XR and the leftward limit XL to be wider as the lateral speed Vped_x of the target object 60 is higher. This makes it earlier to determine whether a target object 60 having a high value of the lateral speed Vped_x is existing in the travelling course of the own vehicle 40. This results in whether there is a possibility of the own vehicle 40 colliding with the target object 60 being determined earlier, thus making it earlier to activate the safety devices including the warning device 31.

The rightward turning reference XR_sway and leftward turning reference XL_sway are set to be respectively smaller than the rightward straight reference XR_str and leftward straight reference XL_str. This enables the drive-assist ECU 10 to set the rightward limit XR and the leftward limit XL upon the own vehicle 40 not travelling straight to be smaller than the rightward limit XR and the leftward limit XL upon the own vehicle 40 travelling straight. Accordingly, even if the target object 60, which is not moving in the lateral direction, is determined to move in the lateral direction, the above configuration reduces a possibility of the target object 60 being determined to be existing in the travelling course of the own vehicle 40.

The cruise-assist ECU 10 is configured to change a value of the coefficient α, which is used to be multiplied to the lateral speed Vped_x of a target object 60 when calculating the right and left correction values ΔXR and ΔXL, depending on the type of the target object 60.

This configuration enables the cruise-assist ECU 10 to set the rightward and leftward limits XR and XL for the target object 60, which is for example a pedestrian having a possibility of rapid lateral movement, to be larger than the rightward and leftward limits XR and XL for the target object 60, which is for example a vehicle unlikely having rapid lateral movement. This configuration therefore further reliably avoids a collision between the target object 60, such as a pedestrian, and the own vehicle 40.

Second Embodiment

The second embodiment establishes a lower limit Xmin for each of the rightward and leftward limits XR and XL in addition to the upper limit Xmax, which is different from the first embodiment. The lower limit Xmin for each of the rightward and leftward limits XR and XL is established to be larger than the corresponding one of the rightward turning reference XR_sway and the leftward turning reference XL_sway. Note that the lower limit Xmin can be for example set in conformance with the width of the own vehicle 40.

Figure 8:
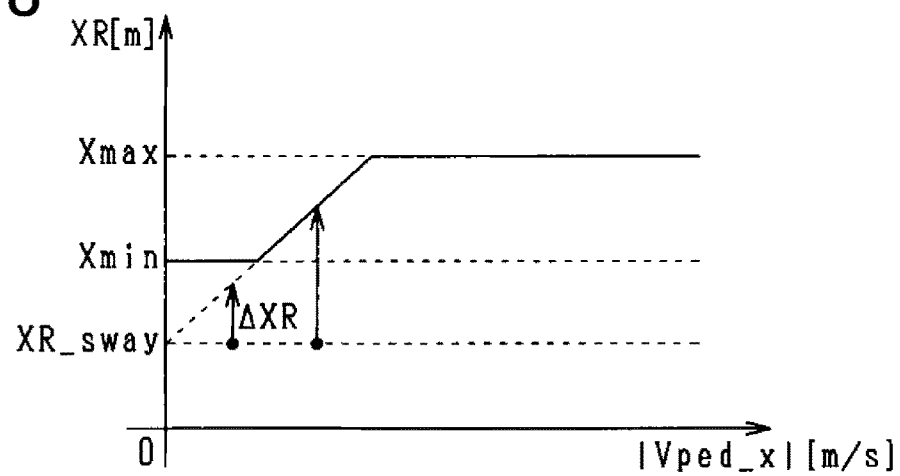
FIG. 8 is a graph illustrating a relationship between the lateral speed and the limit upon the own vehicle turning according to the second embodiment of the present invention.

FIG. 8 illustrates the relationship between the lateral speed Vped_x and the rightward limit XR, i.e. the sum of the rightward turning reference XR_sway and the rightward correction value ΔXR. In FIG. 8, the horizontal axis represents the absolute value of the lateral speed Vped_x, and the vertical axis represents the rightward limit XR.

If the absolute value of the lateral speed Vped_x is lower than a predetermined value TH1, so that the rightward correction value ΔXR is small, the sum of the rightward turning reference XR_sway and the rightward correction value ΔXR becomes lower than the lower limit Xmin. This results in the rightward limit XR being set to the lower limit Xmin.

In contrast, if the absolute value of the lateral speed Vped_x is equal to or higher than the predetermined value TH1, the rightward limit XR is proportional to the absolute value of the lateral speed Vped_x. If therefore the absolute value of the lateral speed Vped_x further increases to be higher than a predetermined value TH2, the rightward limit XR is set to the upper limit Xmax.

Note that, when the own vehicle 40 is travelling straight, the rightward limit XR and the leftward limit XL are each set to be larger than the corresponding lower limit Xmin independently of the lateral speed Vped_x. For this reason, the relationship between the rightward limit XR and the lateral speed Vped_x is similar to the relationship illustrated in FIG. 4 according to the first embodiment.

The configuration of the cruise-assist ECU 10, which serves as a vehicle control apparatus according to the second embodiment, achieves the following advantageous effect in addition to the advantageous effects achieved by the vehicle control apparatus according to the first embodiment.

Specifically, establishing the lower limit Xmin for each of the rightward and leftward limits XR and XL enables the cruise-assist ECU 10 to set each of the rightward and leftward limits XR and XL to the corresponding lower limit Xmin upon determination that 1. The own vehicle 40 is turning and
2. The absolute value of the lateral speed Vped_x of the target object 60 is lower than the predetermined value TH1

This configuration prevents the rightward and leftward limits XR and XL from excessively decreasing, thus reducing erroneous determination that the target object 60 is not located in the travelling course of the own vehicle 40 although the target object 60 is actually located in the travelling course of the own vehicle 40.

Third Embodiment

The overall structure of the cruise-assist ECU 10, which serves as a vehicle control apparatus according to the third embodiment, is substantially identical to the overall structure of the cruise-assist ECU 10 according to the first embodiment, and some of the operations carried out by the limit calculator 13 according to the third embodiment are different from the operations carried out by the limit calculator 13 according to the first embodiment.

As described in the first embodiment, the radar device 21 has the center axis extending in front of the own vehicle 40, and has the predetermined detection range that has the predetermined detection angle extending in the horizontal direction around the center axis. That is, the radar device 21 is configured to detect the position of an object within the detection range. Unfortunately, when performing the calculating of the position of a target object, the position calculated by the cruise-assist ECU 10 may be located outside the detection range of the radar device 21. In this case, it may be determined that the target object is existing although the target object is not actually existing at the calculated position, and unnecessary activation of the safety devices may be carried out upon determination of whether there is a possibility of the own vehicle 40 colliding with the target object being performed.

From this viewpoint, the cruise-assist ECU 10 is configured to limit each of the rightward and leftward limits XR and XL in accordance with the detection range of the radar device 21.

Figure 9:
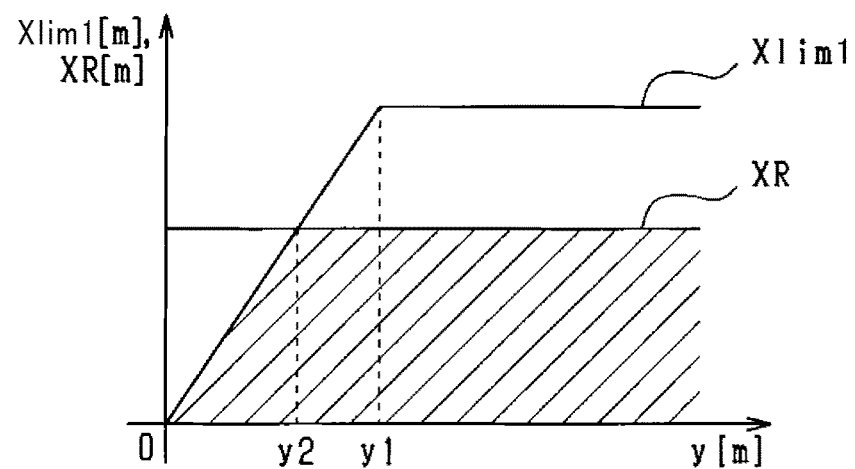
FIG. 9 is a graph illustrating a relationship between the limit and a detection range according to the third embodiment of the present invention.

FIG. 9 illustrates a detection range Xlim1 expanding rightward from the center axis of the radar device 21 in the horizontal direction (see FIG. 7) and the rightward limit XR restricted by the rightward detection range Xlim1. In FIG. 9, the horizontal axis represents the longitudinal position, which is a value of the y axis corresponding to the forward center axis of the own vehicle 40, and the vertical axis represents the length of each of the rightward limit XR and the rightward detection range Xlim1 in the x-axis direction corresponding to the right-lateral direction from the forward center axis of the oven vehicle 40.

The rightward limit XR is kept constant at any longitudinal position thereof. In contrast, the width of the rightward detection range Xlim1 is determined based on the detection angle of the radar device 21. That is, the rightward detection range Xlim1 is zero when the longitudinal position thereof is zero, and the rightward detection range Xlim1 linearly increases based on the detection angle as the longitudinal position thereof increases. When the longitudinal position of the rightward detection range Xlim1 becomes y1, the rightward detection range Xlimi1 becomes a constant value. At a point whose longitudinal position is y2 within the linear increasing portion of the rightward detection range Xlim1, the rightward detection range Xlim1 and the rightward limit XR have the same value, so that the rightward detection range Xlim1 and the rightward limit XR intersect with each other.

This results in the determination region of the target object 60 being based on
1. The rightward detection range Xlim1 while the longitudinal position of the determination region is equal to or smaller than the longitudinal position y2
2. The rightward limit XR when the longitudinal position of the determination region is larger than the longitudinal position y2

FIG. 9 illustrates this determination region of the target object 60 as a hatched region.

Note that the relationship between a detection range Xlim2 expanding leftward from the center axis of the radar device 21 in the horizontal direction (see FIG. 7) and the leftward limit XL is identical to the above relationship between the detection range Xlim1 expanding rightward from the center axis of the radar device 21 in the horizontal direction (see FIG. 7) and the rightward limit XR.

If the upper limit Xmax of each of the rightward limit XR and the leftward limit XL is set to be larger than a maximum value, i.e. a maximum width, of the corresponding one of the detection ranges Xlim1 and Xlim2 at the longitudinal position y1, each of the rightward limit XR and the leftward limit XL can take a value larger than the maximum width of the corresponding one of the detection ranges Xlim1 and Xlim2. In this case, the horizontal width of the determination region is identical to the horizontal width of the rightward and leftward detection range Xlim. However, the upper limit Xmax of each of the rightward limit XR and the leftward limit XL is usually set to be smaller than the maximum width of the corresponding one of the detection ranges Xlim1 and Xlim2, because the positions of target objects located outside the detection range of the radar device 21 cannot be accurately detected.

The other structure of the cruise-assist ECU 10 according to the third embodiment is identical to the structure of the cruise-assist ECU 10 according to the first embodiment.

The configuration of the cruise-assist ECU 10, which serves as a vehicle control apparatus according to the third embodiment, achieves the following advantageous effect in addition to the advantageous effects achieved by the vehicle control apparatus according to the first embodiment.

The radar device 21 has the center axis extending in front of the own vehicle 40, and is configured to detect objects within the detection range that has the predetermined detection angle extending in the horizontal direction around the center axis. For this reason, some objects may be located outside the detection range of the radar device 21.

If a target object 60, which was previously detected by the cruise-assist ECU 21, is not detected in a current cycle, the configuration of the cruise-assist ECU 21 stores the previous position of the target object, for example, the position detected in the immediately previous cycle. For this reason, the current position of the target object may be located outside the detection ranges Xlim1 and Xlim2. In addition, an object, which is located outside the detection ranges Xlim1 and Xlim2, may be erroneously detected as a target object. If an object, which is located outside the detection ranges Xlim1 and Xlim2, is erroneously detected as a target object, and the safety devices are activated for the detected target object, these activations of the safety devices are unnecessary activations.

From this viewpoint, the cruise-assist ECU 10 according to the third embodiment is configured to limit the determination region of a target object based on the detection ranges Xlim1 and Xlim2. This configuration prevents an object detected outside the detection ranges Xlim1 and Xlim2 from being determined as a target object existing in the travelling course of the own vehicle 40, thus reducing unnecessary activations of the safety devices.

Fourth Embodiment

The cruise-assist ECU 10 according to the first embodiment has established the determination region based on the rightward limit XR and leftward limit XL of a target object 60 in the forward travelling direction of the own vehicle 40 described above. The activation determiner 14 of the cruise-assist ECU 40 performs a first determination routine that determines whether there is a possibility of the own vehicle 40 colliding with a target object 60 in accordance with whether the target object 60 is existing in the corresponding determination region.

In contrast, the activation determiner 14 of the cruise-assist ECU 40 according to the fourth embodiment is configured to perform a second determination routine that 1. Predicts a movement trajectory of a target object 60
2. Obtains, as a predicted lateral position 62, an intersection point between the movement trajectory and the horizontal direction, i.e. the x-axis direction, at the front end of the own vehicle 40
3. Determines whether the predicted lateral position 62 is located within the determination region defined by the rightward limit XR and leftward limit XL to correspondingly determine whether there is a possibility of the own vehicle 40 colliding with the target object 60.

Figure 10:
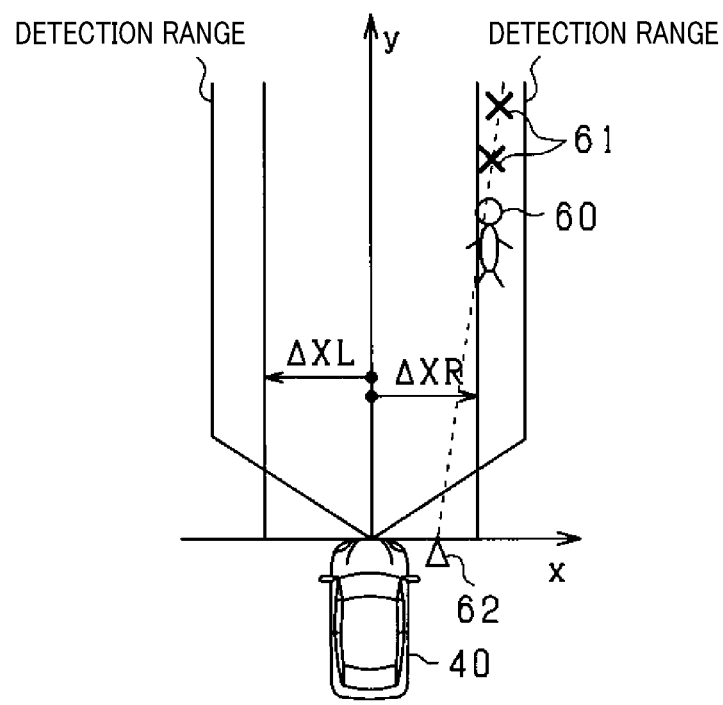
FIG. 10 is a view illustrating a method of determining whether there is a possibility of the own vehicle colliding with an object according to the fourth embodiment of the present invention.

FIG. 10 schematically illustrates a collision possibility determining method based on the predicted lateral position 62, which is carried out by the activation determiner 14. Descriptions of the rightward and leftward limits XR and XL are omitted, because they can be obtained in the same manner as the first embodiment.

As described above, the object recognizer 11 stores, in the memory, the previous positions 61 of the target object 60 as the position history, i.e. the detection history, during the predetermined time period.

In particular, the activation determiner 14 includes the collision time calculator 14b serving as the collision time calculating means. The collision time calculator 14b predicts the movement trajectory of the target object 60 based on the previous positions 61 and the current position of the target object 60. Then, the collision time calculator 14b assumes the target object 60 moves the predicted movement trajectory, and calculates, as the predicted lateral position 62, the lateral position of a point at which the movement trajectory and the horizontal direction, i.e. the x-axis direction, at the front end of the own vehicle 40 are in agreement with each other; the longitudinal position of this point becomes zero.

The activation determiner 14 includes a determiner 14c. The determiner 14c compares the predicted lateral position 62 with each of the rightward limit XR and the leftward limit XL. Then, the determiner 14c determines that there is a possibility of the own vehicle 40 colliding with the target object 60 upon determination that the predicted lateral position 62 is located within the determination region defined by the rightward limit XR and the leftward limit XL. Note that descriptions of the operations after determination that there is a possibility of the own vehicle 40 colliding with the target object 60 are omitted, because they are identical to the descriptions of the operations after determination that there is a possibility of the own vehicle 40 colliding with the target object 60 according to the first embodiment.

Even if a target object 60 is located rightward relative to the center line of the own vehicle 40 along its travelling direction, the predicted lateral position 62 of the target object 60 may be obtained at a position located leftward relative to the center line of the own vehicle 40 due to the movement trajectory of the target object 60. For addressing such a situation, the limit calculator 13 according to the fourth embodiment is configured to calculate the leftward limit XL in the same manner as the rightward limit XR even if the target object 60 is located rightward relative to the center line of the own vehicle 40 along its travelling direction. A value of the leftward limit XL can be equal to or different from a value of the rightward limit XR.

The other structure of the cruise-assist ECU 10 according to the fourth embodiment is identical to the structure of the cruise-assist ECU 10 according to the first embodiment.

The configuration of the cruise-assist ECU 10, which serves as a vehicle control apparatus according to the fourth embodiment, achieves the following advantageous effect in addition to the advantageous effects achieved by the vehicle control apparatus according to the first embodiment.

Let us assume that a target object 60 is moving to approach the travelling course of the own vehicle 40. In this assumption, even if the target object 60 is located outside the determination region, the activation determiner 14 can calculate the predicted lateral position 62 of the target object 60 as long as the current position of the target object 60 is located within the detection range of the radar device 21. The activation determiner 14 according to the fourth embodiment determines whether there is a possibility of the own vehicle 40 colliding with the target object 60 in accordance with the predicted lateral position 62, the rightward limit XR, and the leftward limit XL.

For this reason, this configuration enables whether there is a possibility of the own vehicle 40 colliding with the target object 60 to be determined earlier than the other configuration to determine whether there is a possibility of the own vehicle 40 colliding with the target object 60 using the current position of the target object 60. This therefore results in further improvement of the safety of the own vehicle 40.

Fifth Embodiment

In the cruise-assist ECU 10 according to the fourth embodiment, the determination task to determine whether the own vehicle 40 is travelling straight, which is carried out by the travelling state determiner 12, is different from the determination task according to the first embodiment. Specifically, a yaw rate sensor 100 is provided in the own vehicle 40; the yaw rate sensor 100 is illustrated by a phantom line in FIG. 1. The yaw rate sensor 100 is connected to the cruise-assist ECU 10. The yaw rate sensor 100 is operative to measure acceleration of the own vehicle 40 in the turning direction of the own vehicle 40, and transmit, to the cruise-assist ECU 10, a measurement signal indicative of the measured acceleration.

The travelling state determiner 12 of the cruise-assist ECU 10 obtains the acceleration of the own vehicle 40 in its turning direction in accordance with the measurement signal transmitted from the yaw rate sensor 100. Then, the travelling state determiner 12 determines whether the own vehicle 40 is meandering in accordance with the obtained acceleration of the own vehicle 40 in its turning direction.

Figure 11A:
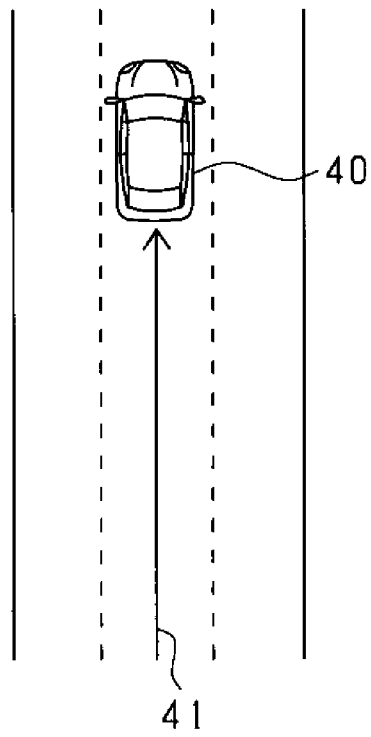
FIG. 11A is a view illustrating a method of determining whether the own vehicle is travelling straight according to the fifth embodiment of the present invention.
Figure 11B:
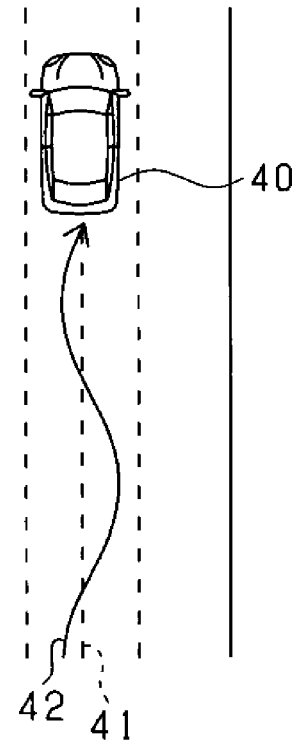
FIG. 11B is a view illustrating the method of determining whether the own vehicle is travelling straight according to the fifth embodiment of the present invention.

FIG. 11A illustrates the history of values of the turning acceleration when the own vehicle 40 is travelling straight using reference numeral 41, and FIG. 11B illustrates the history of values of the turning acceleration when the own vehicle 40 is meandering using reference numeral 42. Specifically, the travelling state determiner 12 stores the history of values of the turning acceleration measured by the yaw rate sensor 100 during a predetermined time period. As illustrated in FIG. 11A, the history 41 of the values of the turning acceleration measured by the yaw rate sensor 100 substantially shows a linear shape.

In contrast, as illustrated in FIG. 11B, the history 42 of the values of the turning acceleration measured by the yaw rate sensor 100 substantially shows a curved shape, i.e. a snaking shape.

Specifically, the travelling state determiner 12 determines whether the variation width of the history of values of the turning acceleration measured by the yaw rate sensor 100 is larger than a predetermined range, and determines that the own vehicle 40 is meandering upon determination that variation width of the history of values of the turning acceleration measured by the yaw rate sensor 100 is larger than the predetermined range.

The other structure of the cruise-assist ECU 10 according to the fifth embodiment is identical to the structure of the cruise-assist ECU 10 according to the first embodiment.

The above configuration of the cruise-assist ECU 10, which serves as a vehicle control apparatus according to the fifth embodiment, achieves the same advantageous effect as the advantageous effects achieved by the vehicle control apparatus according to the first embodiment.

Modifications

In each embodiment, the rightward straight reference XR_str, the leftward straight reference XL_str, the rightward turning reference XR_sway, and the leftward turning reference XL_sway are set to respective constant values. For example, the limit calculator 13 can change each of the rightward straight reference XR_str, the leftward straight reference XL_str, the rightward turning reference XR_sway, and the leftward turning reference XL_sway in accordance with, for example, 1. The speed of the own vehicle 40
2. The relative speed of the target object 60 relative to the own vehicle 40
3. The curvature of the road on which the own vehicle 40 is travelling The curvature of the road can be for example obtained from a captured image.

For example, a risk of collision between the own vehicle 40 and a target object 60 in a first situation where the speed of the own vehicle 40 is higher than a predetermined threshold and/or the relative speed of the target object 60 relative to the own vehicle 40 is higher than a predetermined threshold is relatively higher than a risk of collision between the own vehicle 40 and the target object 60 in a second situation where the speed of the own vehicle 40 is equal to or lower than the predetermined threshold and/or the relative speed of the target object 60 relative to the own vehicle 40 is equal to or lower than the predetermined threshold.

For this reason, the limit calculator 13 can be configured such that each of the rightward straight reference XR_str, the leftward straight reference XL_str, the rightward turning reference XR_sway, and the leftward turning reference XL_sway established in the first situation is larger than in the second situation.

Alternatively, the limit calculator 13 can be configured such that a value of the coefficient α established in the occurrence of the first situation is larger than a value of the coefficient α established in the occurrence of the second situation.

This variable setting of each of the rightward straight reference XR_str, the leftward straight reference XL_str, the rightward turning reference XR_sway, and the leftward turning reference XL_sway can be applied for a target object 60 whose calculated value of the TTC is shorter. Similarly, this variable setting of a value of the coefficient α can also be applied for a target object 60 whose calculated value of the TTC is shorter.

If there is a third situation where the curvature of the road on which the own vehicle 40 is travelling is larger than a predetermined threshold, there is a possibility of the detected value of the lateral speed Vped_x of an object being incorrect.

For this reason, the limit calculator 13 can be configured such that a value of each the rightward turning reference XR_sway and the leftward turning reference XL_sway in the third situation is smaller than a value of the corresponding one of the rightward turning reference XR_sway and the leftward turning reference XL_sway in the fourth situation where the curvature of the travelling road of the own vehicle 40 is equal to or smaller than the predetermined threshold.

The limit calculator 13 can variably set the upper limit Xmax depending on the travelling state of the own vehicle 40. As described above, a risk of collision between the own vehicle 40 and a target object 60 in the first situation is relatively higher than a risk of collision between the own vehicle 40 and the target object 60 in the second situation.

For this reason, the limit calculator 13 can be configured to set a value of the upper limit Xmax established in the occurrence of the first situation to be larger than a value of the upper limit Xmax established in the occurrence of the second situation.

This variable setting of the upper limit Xmax can be applied for a target object 60 whose calculated value of the TTC is shorter.

In the third situation, there is a possibility of the detected value of the lateral speed Vped_x of an object being incorrect. For this reason, the limit calculator 13 can be configured such that a value of each the rightward turning reference XR_sway and the leftward turning reference XL_sway in the third situation is smaller than a value of the corresponding one of the rightward turning reference XR_sway and the leftward turning reference XL_sway in the fourth situation.

The limit calculator 13 can be configured to variably set the lower limit Xmin in accordance with the travelling state of the own vehicle 40, which is similar to setting of the upper limit Xmax.

In each embodiment, values, which are referred to as first limit values, of the rightward and leftward limits XR and XL for activating the warning device 31 can be set to be different from values, which are referred to as second limit values, of the rightward and leftward limits XR and XL for activating the brake device 32 and the seatbelt device 33. As described above, the warning device 31 is controlled to be activated earlier than the brake device 32 and the seatbelt device 33. For this reason, setting the first limit values to be larger than the second limit values enables the warning device 31 to be more easily activated.

The limit calculator 13 according to each embodiment can change each of the rightward and leftward turning references XR_sway and XL_sway in accordance with whether the own vehicle 40 is turning right or turning left.

Each embodiment sets the upper limit Xmax for the rightward limit XR, but cannot necessarily set the upper limit Xmax for the rightward limit XR. In particular, if the detection range Xlim restricts the determination region as described in the fourth embodiment, this restriction can be used in place of the upper limit Xmax.

The second embodiment sets the lower limit Xmin to be smaller than each of the rightward straight reference XR_str and the leftward straight reference XL_str, but can set the lower limit Xmin to be larger than each of the rightward straight reference XR_str and the leftward straight reference XL_str.

The travelling state determiner 12 according to the first embodiment determines whether the own vehicle 40 is travelling straight in accordance with the lane marking lines 50 captured by the imaging device 22.

Figure 12:
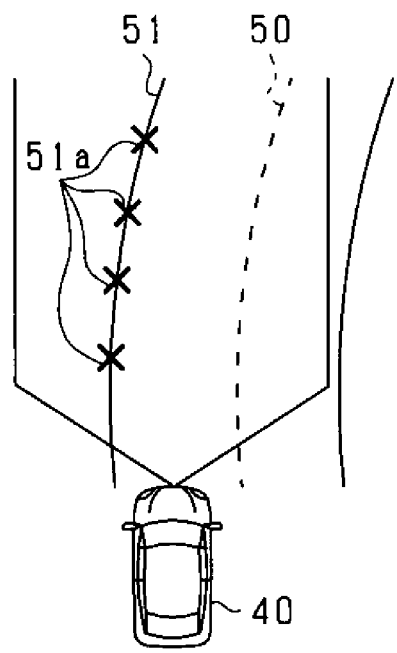
FIG. 12 is a view illustrating another method of determining whether the own vehicle is travelling straight according to a modification of each embodiment of the present invention.

In contrast, the travelling state determiner 12 can determine whether the own vehicle 40 is travelling straight in accordance with the positions 50a of plural points of a road structure 51a, such as a guardrail, detected by the radar device 21 (see FIG. 12).

Figure 13:
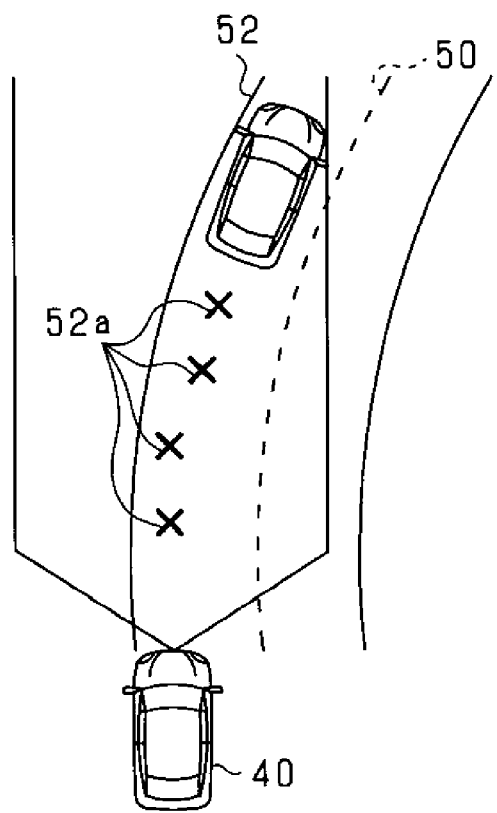
FIG. 13 is a view illustrating a further method of determining whether the own vehicle is travelling straight according to another modification of each embodiment of the present invention.

In addition, in the situation where the own vehicle 40 is following a preceding vehicle 52 (see FIG. 13), the travelling state determiner 12 can be configured to determine whether the preceding vehicle 52 is travelling straight in accordance with the history of the detected positions 52a of the preceding vehicle 52, and use the determination result of whether the preceding vehicle 52 is travelling straight as the determination result of whether the own vehicle 40 is travelling straight.

The limit calculator 13 according to each embodiment adds the rightward correction value ΔXR to the rightward straight reference XR_str or the rightward turning reference XR_sway to calculate the rightward limit XR, but can multiply the rightward correction value ΔXR to the rightward straight reference XR_str or the rightward turning reference XR_sway to calculate the rightward limit XR. The leftward limit XL can be calculated in the same manner as the rightward limit XR.

The cruise-assist ECU 10 according to each embodiment is configured to avoid a collision of the own vehicle 40 with an object existing in the forward travelling direction of the own vehicle 40 while the own vehicle 40 is travelling in the forward direction, but the present invention is not limited thereto. Specifically, the cruise-assist ECU 10 can be configured to detect an object existing in the travelling direction of the own vehicle 40 while the own vehicle 40 is travelling in the backward direction, and avoid a collision of the own vehicle 40 with the detected object. That is, the travelling direction of the own vehicle 40 means the forward direction of the own vehicle 40 when the own vehicle 40 is travelling forward, and also means the backward direction of the own vehicle 40 when the own vehicle 40 is travelling backward.

Each embodiment includes the warning device 31, the brake device 32, and the seatbelt device 33 as the safety devices, but the safety devices are not limited to these devices. Specifically, each embodiment can use various types of safety devices for avoiding collisions and/or mitigating collision damages.

In each embodiment, the own vehicle 40 is driven by a driver, but the present invention can be similarly applied to the own vehicle 40 that is automatically driven by, for example, a vehicle control ECU. In this modification, the activation determiner 14 and the control processor 15 are configured not to operate the warning device 31 and the brake-assist function of the brake device 32, and configured to operate the automatic brake function of the brake device 32 and the seatbelt device 33.

This application is based on and claims the benefit of priority from Japanese Patent Application 2015-072918, the disclosure of which is incorporated in its entirety herein by reference.

REFERENCE SIGNS LIST

10 . . . Cruise-assist ECU, 11 . . . Object recognizer, 12 . . . Travelling state determiner, 13 . . . Limit calculator, 14 . . . Activation determiner, 40 . . . Own vehicle, 60 . . . Target object

The invention claimed is:

1. An object existence determination apparatus comprising:

an obtaining means that obtains a lateral position and a lateral speed of a target object located in a travelling direction of an own vehicle, the lateral position representing a relative position of the target object relative to the own vehicle in a lateral direction perpendicular to the travelling direction of the own vehicle, the lateral speed representing a lateral relative speed of the target object relative to the own vehicle in the lateral direction;

a straight travel determining means that determines whether the own vehicle is travelling straight;

a setting means that sets an object existence determination region in the travelling direction of the own vehicle in accordance with the lateral speed obtained by the obtaining means and a determination result by the straight travel determining means, the object existence determination region having a width in the lateral direction;

an existence determining means that determines, based on the lateral position of the target object and the object existence determination region, whether there is a possibility of at least part of the target object existing on a travelling course of the own vehicle; and an activation means that activates an output device provided in the own vehicle based upon determination that there is a possibility of at least part of the target object existing on a travelling course of the own vehicle, the setting means being configured to:
set the width of the object existence determination region in the lateral direction to be larger as the lateral speed becomes higher; and
set, upon determination that the own vehicle is not travelling straight, the width of the object existence determination region in the lateral direction to be smaller than the width of the object existence determination region in the lateral direction used based on the own vehicle travelling straight.

2. The object existence determination apparatus according to claim 1, wherein:

the setting means is configured to calculate a sum of a reference region set based on the determination result by the straight travel determining means and a correction region set based on the lateral speed to correspondingly set the object existence determination region.

3. The object existence determination apparatus according to claim 1, wherein:

the existence determining means is configured to perform, as the determination of whether there is a possibility of at least part of the target object existing in the travelling course of the own vehicle, at least one of a first determination routine and a second determination routine, the first determination routine determining whether at least part of the target object is existing in the object existence determination region in accordance with the lateral position of the target object and the object existence determination region; and the second determination routine determining whether there is a possibility of at least part of the target object existing in the object existence determination region in accordance with the lateral position of the target object and the object existence determination region.

4. The object existence determination apparatus according to claim 3, wherein:

the obtaining means is configured to obtain the lateral position and, as the lateral relative speed relative to the own vehicle, the lateral speed of the target object in accordance with detection information, the detection information being obtained by a sensor device provided to the own vehicle, and being within a detection range of the sensor device in which the target object is detectable; and the setting means is configured to limit, based on the detection range of the sensor device, the object existence determination region.

5. The object existence determination apparatus according to claim 1, wherein:

the obtaining means is configured to:
cyclically obtain the lateral position of the target object and a longitudinal position of the target object, the longitudinal position of the target device being a relative position of the target object relative to the own vehicle in the travelling direction of the own vehicle; and
store the cyclically obtained lateral positions and the longitudinal positions of the target object as historical information;

the existence determining means further comprises a calculation means that:
estimates a movement trajectory of the target object in accordance with the historical information about the longitudinal positions and lateral positons of the target object; and
calculates, as a predicted lateral position, a lateral position of an intersection point between the estimated movement trajectory and a horizontal line passing through a front end of the own vehicle, the existence determining means being configured to determine whether there is a possibility of the target object existing in the travelling course of the own vehicle based on determination of whether the predicted lateral position is located within the object existence determination region.

6. The object existence determination apparatus according to claim 1, wherein:

the target object comprises a plurality of target objects;
the obtaining means is configured to obtain the lateral position and the lateral speed of each of the target objects;
the setting means is configured to set the object existence determination region for each of the target objects; and
the existence determining means is configured to determine whether there is a possibility of at least part of each of the target objects existing in the travelling course of the own vehicle in accordance with the lateral position of the corresponding one of the target objects and the object existence determination region of the corresponding one of the target objects.

7. The object existence determination apparatus according to claim 1, wherein:

the object existence determination region includes:
a rightward existence determination region located rightward relative to the travelling direction of the own vehicle; and
a leftward existence determination region located leftward relative to the travelling direction of the own vehicle; and the setting means is configured to set the rightward existence determination region and the leftward existence determination region in accordance with at least one of the lateral position of the target object and the determination result by the straight travel determining means.

8. The object existence determination apparatus according to claim 1, further comprising:

a type identifying means that identifies a type of the target object,
wherein the setting means is configured to change the object existence determination region in accordance with the identified type of the target object.

9. The object existence determination apparatus according to claim 1, wherein:

the obtaining means is configured to obtain:
a longitudinal position of the target object, the longitudinal position of the target device being a relative position of the target object relative to the own vehicle in the travelling direction of the own vehicle; and
at least one of a relative speed and a relative acceleration between the target object and the own vehicle, the object existence determination apparatus further comprising:
a time-to-collision calculating means that calculates, based on the longitudinal position and at least one of the relative speed and the relative acceleration, a time to collision representing a margin time until which the own vehicle will collide with the target object; and
an activation means that activates a brake device provided in the own vehicle in accordance with the time to collision calculated by the time-to-collision calculating means.

10. The object existence determination apparatus according to claim 9, wherein:

the activation means is configured to activate a warning device provided in the own vehicle in accordance with a determination result by the existence determining means and the time to collision calculated by the time-to-collision calculating means; and the setting means includes, as the object existence determination region, a first determination region for determining whether to activate the warning device, and a second determination region for determining whether to activate the brake device, each of the first and second determination region having a width in the lateral direction, the setting means being configured to set the width of the first determination region in the lateral direction to be larger than the width of the first determination region in the lateral direction.

11. The object existence determination apparatus according to claim 1, wherein:

the obtaining means comprises:
a first obtaining means that obtains, from a radar device that transmits a probing wave and correspondingly receives a reflection wave from an object, a first position of the object based on the reflection wave, the first position representing a relative position of the object relative to the own vehicle; and
a second obtaining means that obtains a position of an object based on an image of the object captured by an imaging device as a second position, the obtaining means is configured to:
obtain the lateral position and the lateral speed of a first target object as the target object, the first target object being an object whose first position and second position are both detected; and
obtain the lateral position and the lateral speed of a second target object as the target object, the second target object being an object whose first position or second position is only detected; and the setting means is configured to set the width of the object existence determination region for the first target object in the lateral direction to be larger than the width of the object existence determination region for the second target object in the lateral direction.

12. The object existence determination apparatus according to claim 1, wherein:
at least one of an upper limit and a lower limit is set for the width of the object existence determination region.

13. The object existence determination apparatus according to claim 1, wherein:
the setting means is configured to variably set the width of the object existence determination region in the lateral direction in accordance with at least one of a speed of the own vehicle and a relative speed between the own vehicle and the target object.

14. The object existence determination apparatus according to claim 1, wherein the output device comprises at least one of a warning device, a brake device and a seatbelt device.

15. An object existence determination method comprising:
an obtaining step that obtains a lateral position and a lateral speed of a target object located in a travelling direction of an own vehicle, the lateral position representing a relative position of the target object relative to the own vehicle in a lateral direction perpendicular to the travelling direction of the own vehicle, the lateral speed representing a lateral relative speed of the target object relative to the own vehicle in the lateral direction;
a straight travel determining step that determines whether the own vehicle is travelling straight;
a setting step that sets an object existence determination region in the travelling direction of the own vehicle in accordance with the lateral speed obtained by the obtaining step and a determination result by the straight travel determining step, the object existence determination region having a width in the lateral direction; and
an existence determining step that determines, based on the lateral position of the target object and the object existence determination region, whether there is a possibility of at least part of the target object existing on a travelling course of the own vehicle; and
an activation step that activates an output device provided in the own vehicle upon determination that there is a possibility of at least part of the target object existing on a travelling course of the own vehicle;
wherein an increase in the width of the object existence determination region in the lateral direction is directly proportional to the lateral speed, and
wherein the setting step comprises:
setting, upon determination that the own vehicle is not travelling straight, the width of the object existence determination region in the lateral direction to be smaller than the width of the object existence determination region in the lateral direction used based on the own vehicle travelling straight.

16. The object existence determination method according to claim 15, wherein the output device comprises at least one of an output warning device, a braking device and a seatbelt device.

* * * * *